United States Patent [19]
Schär

[11] 3,765,223
[45] Oct. 16, 1973

[54] LIGHT BEAM METHOD FOR TESTING A CLOCKWORK MECHANISM

[76] Inventor: Albert Schär, Garternweg 8, Lotzwil, Switzerland

[22] Filed: Sept. 25, 1972

[21] Appl. No.: 292,107

Related U.S. Application Data

[63] Continuation of Ser. No. 135,648, April 20, 1971, abandoned.

[52] U.S. Cl. .................................. 73/6, 356/209
[51] Int. Cl. ........................................ G04b 17/00
[58] Field of Search .................. 73/6; 356/209, 211

[56] References Cited
UNITED STATES PATENTS

| 1,991,477 | 2/1935 | Urie | 73/6 |
| 2,231,849 | 2/1941 | Gibbs et al. | 73/6 |
| 2,360,053 | 10/1944 | Gibbs | 73/6 |

*Primary Examiner*—David Schonberg
*Assistant Examiner*—F. L. Evans
*Attorney*—Lawrence E. Laubscher

[57] ABSTRACT

A method for analyzing the out of beat error of oscillation of a clockwork lever connected for oscillation between and parallel with a movement plate and a member having a reflective surface, wherein an incident light beam is directed from said movement plate toward said reflective surface to produce a reflected light beam, at least one of said incident and reflected light beams being in the path of oscillation of said lever to produce adjacent said movement plate a reflected modulated light beam, and analyzing the modulated reflected light beam to determine the quantity of a given function of oscillation of said lever.

4 Claims, 1 Drawing Figure

PATENTED OCT 16 1973　　　　　　　　　　3,765,223
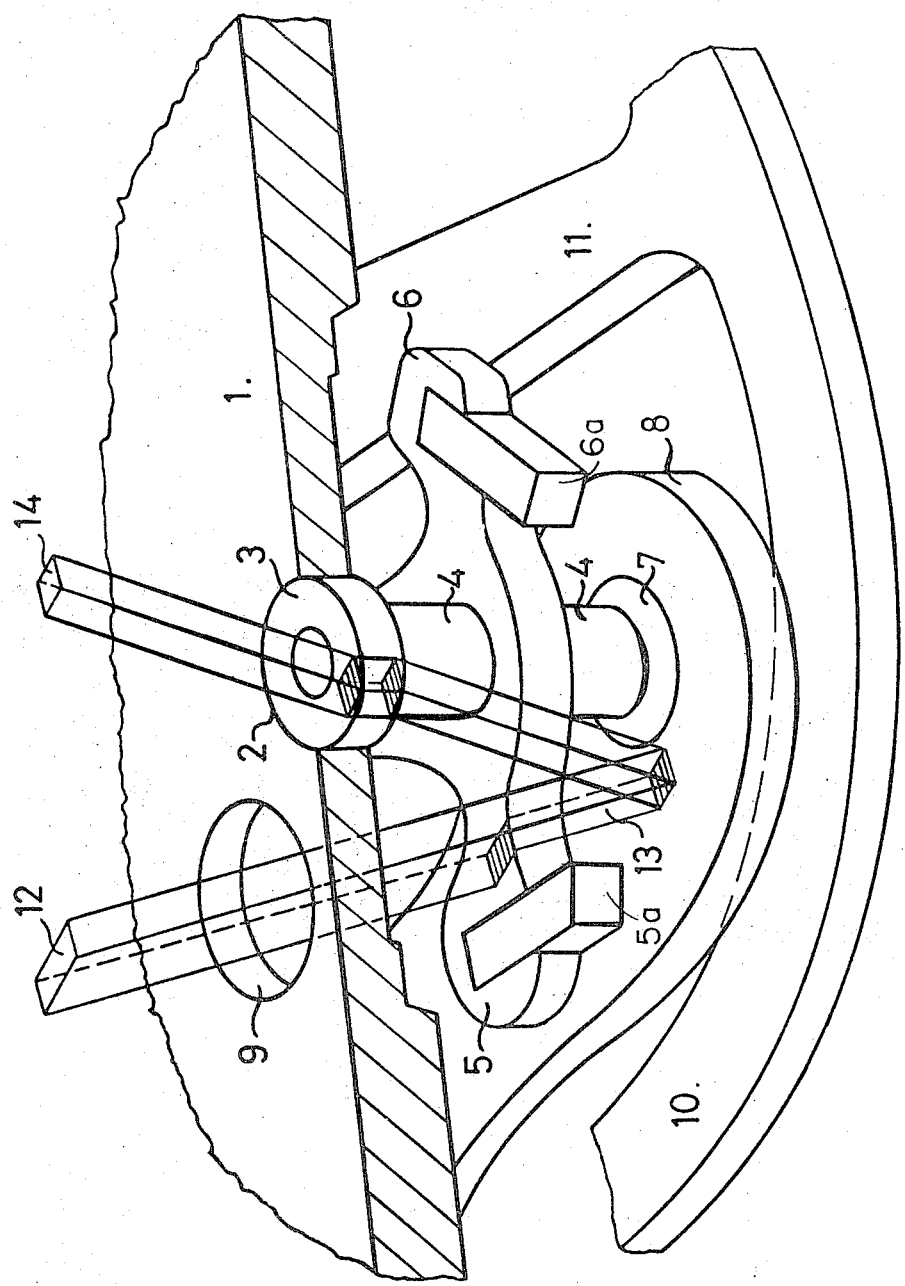
Albert Schär
INVENTOR.
BY Lawrence E. Laubscher
ATTORNEY

LIGHT BEAM METHOD FOR TESTING A CLOCKWORK MECHANISM

This is a continuation of application Ser. No. 135,648 filed Apr. 20, 1971, now abandoned.

In order to ascertain the out of beat error or another motional quantity of the lever of a clockwork mechanism comprising a balance wheel and an escapement, the shadow effect of part of the lever has been used to modulate a light beam penetrating the range of movement of the lever. The modulated light beam then meets photo-electric pick-up means which in turn supplies, by means of electronic amplifiers, or the like, electrical measurements that are a function of the movement of the lever. However, this known process has not gained any practical importance since, particularly in the case of small clockwork mechanisms, it could be used only with optical aids which would be very expensive and difficult to adjust.

The present invention thus relates to a method of ascertaining a motional quantity of the lever of a clockwork mechanism comprising a balance wheel and an escapement, wherein an incident or reflected light beam penetrates the range of movement, according to the position in each particular case. The drawbacks of the previous optical methods, briefly outlined above, are avoided by the present invention, in that the light beam points into the clockwork mechanism at the side of its movement plate, that the light beam is reflected by a surface which is located between the lever and the balance and which is mounted on a component of the clockwork mechanism fixed to the movement plate, and that the reflected light beam leaves the clockwork mechanism on the remote side of its movement plate.

An example of the method of the invention will now be further explained with reference to the accompanying drawing, the single FIGURE of which is a detailed perspective view of the clockwork lever components upon which the method of the present invention is practiced.

Referring to the drawing, the movement plate 1 is shown in section, the sectional plane passing through the bore 2 in which is secured a transparent jewel 3 for mounting the lever spindle 4 at one end on the movement plate 1. The lever as usual comprises the two lever arms 5 and 6 provided with pallet jewels 5a, 6a, respectively, and the lever fork (not shown), which is joined by the stem of the fork to the arms 5 and 6. The journal end of the lever spindle 4 facing away from the plate 1 is mounted as usual in a further bearing jewel 7, the latter being fixed in the lever bridge 8 the upper surface of which is reflective. The foot (not shown) of the bridge 8 is screwed to the movement plate 1. In order that the pallet jewels seated in the arms 5 and 6 can be adjusted, finishing openings assigned to these arms are provided in the plate 1. Only the finishing opening assigned to the lever arm 5 is illustrated in the drawing. The drawing shows only part of the balance wheel ring 10 and one of the balance wheel spokes 11.

A particularly simple embodiment of the method of the invention is obtained when a light beam 12 (of rectangular cross-section, for example) is pointed down through the finishing hole 9, in such a way that it always falls partly on the lever arm 5 and partly on the reflective surface of the lever bridge 8 facing towards the lever 5 to 6, is reflected by the latter and then emerges from the clockwork mechanism through the bearing jewel 3. The cross-section of the portion 13 of the light beam 12 falling on the lever bridge 8 and, similarly, the cross-section of the reflected portion 14 thus depend on the position of the lever arm 5, so that the emerging light beam 14 is modulated in respect of its cross-section according to the movement of the lever. In the drawing, the surface parts of the lever arm 5, lever bridge 8 and bearing jewel 3, which are illuminated by the light beam, are all indicated by close cross-hatching.

The optical device (not shown) which produces the incident light beam 12 and removes the reflected and modulated light beam 14 can obviously dispense with the use of special deviating mirrors and may be comparatively simple in construction. Furthermore, owing to the reflection at the lever bridge 8, the path 12, 13, 14 of the light beam inside the clockwork mechanism is such that it cannot be affected by the spokes 11 of the balance wheel 10.

When carrying out the method of the invention, it is not absolutely essential for the reflected and modulated light beam 14 to leave the clockwork mechanism through the bearing stone 3. An opening provided exclusively for the emergence of the light beam 14 could instead be formed in the movement plate 1. Similarly, the light beam 12 could be brought into the clockwork mechanism not through a finishing opening 9, but through a special entry opening provided for the purpose in the plate 1. Finally, the reflection of the light beam which must take place inside the clockwork mechanism need not necessarily happen at the lever bridge 8; it could just as well take place on a surface located between the lever 5 to 6 and the balance wheel 10 to 11 and mounted on another component fixed to the movement plate 1. If such modifications are used it may then be advantageous for the light beam to be modulated with the aid of the stem of the fork or the lever fork itself.

While in accordance with the Patent Statutes I have illustrated and described the preferred form of the invention, it is apparent to those skilled in the art that changes may be made without deviating from the inventive concept.

What is claimed is:

1. The method of analyzing the oscillatory movement of the lever arm means (5,6) of a clockwork mechanism including a movement plate (1) containing first (9) and second (2) openings, a balance wheel (10) parallel with said movement plate, spindle means (4) supporting said lever arm means for oscillatory motion between and parallel with said movement plate and said balance wheel, and means defining a reflective surface facing said lever arm means and arranged between the path of oscillatory movement of said lever arm means and said balance wheel, which comprises the steps of directing an incident light beam from a source external of said mechanism through said first opening, through said mechanism and onto said reflective surface;

directing the reflected light beam reflected from said reflective surface outwardly from said mechanism through said second opening, one of said incident and reflected beams extending within the range of movement of said lever arm means; and analyzing the lever-modulated reflected light beam following the exit thereof through said second opening, thereby to determine the oscillatory movement of said lever arm means.

2. For use in connection with a clockwork mechanism including in successive parallel arrangement, a movement plate (1) containing first (9) and second (2) openings, a lever arm (5,6), a lever bridge (8) and a balance wheel (10,11), said mechanism including also spindle means (4) journalled between said movement plate and said lever bridge for supporting said lever arm for oscillatory movement relative to said movement plate, said lever bridge having a reflective surface facing said lever arm, the method of analyzing the oscillatory movement of said lever arm which comprises the steps of directing an incident light beam from a source external of said mechanism onto said lever bridge reflective surface through said first opening;

directing the reflected light beam reflected from said lever bridge reflective surface outwardly from said mechanism through said second opening (2), one of said incident and reflected beams extending within the range of movement of said lever arm; and analyzing the lever-modulated reflected light beam following the exit thereof through said second opening, thereby to determine the oscillatory movement of said lever arm.

3. For use in connection with a clockwork mechanism including in successive parallel arrangement, a movement plate (1) containing a first opening (9) and a jewel opening (2) for receiving a transparent jewel bearing (3), lever arm means (5,6), a lever bridge (9), and a balance wheel (10,11), said mechanism including also spindle means (5,6), journalled at one end with said jewel bearing and at the other end with said lever bridge for supporting said lever arm means for oscillatory movement relative to said movement plate, said lever bridge having a reflective surface facing said lever arm means; the method of analyzing the oscillatory movement of said lever arm means which comprises the steps of directing an incident light beam from a source external of said mechanism onto said lever bridge reflective surface through said first opening;

directing the reflected light beam reflected from said lever bridge reflective surface outwardly from said mechanism through said jewel bearing (3), one of said incident and reflected beams extending within the range of movement of said lever arm means; and analyzing the lever-modulated reflected light beam following the exit thereof through said jewel bearing, thereby to determine the oscillatory movement of said lever arm means.

4. The method as defined in claim 3, wherein said lever arm means includes a pair of arms for supporting pallet jewels, respectively, one of said incident and reflected light beams being modulated by one of said arms.

* * * * *